United States Patent [19]

Smith et al.

[11] Patent Number: 5,119,475
[45] Date of Patent: Jun. 2, 1992

[54] OBJECT-ORIENTED FRAMEWORK FOR MENU DEFINITION

[75] Inventors: Reid G. Smith; Eric J. Schoen, both of Austin, Tex.

[73] Assignee: Schlumberger Technology Corporation, New York, N.Y.

[21] Appl. No.: 754,366

[22] Filed: Aug. 29, 1991

Related U.S. Application Data

[63] Continuation of Ser. No. 668,319, Mar. 13, 1991, abandoned, which is a continuation of Ser. No. 195,129, May 17, 1988, abandoned.

[51] Int. Cl.⁵ .............................................. G06F 3/153
[52] U.S. Cl. .................................... 395/156; 395/160
[58] Field of Search ................. 395/156, 160; 340/721, 340/734

[56] References Cited

U.S. PATENT DOCUMENTS

| | | | |
|---|---|---|---|
| 4,760,390 | 7/1988 | Maine et al. | 340/725 X |
| 4,782,463 | 11/1988 | Sanders et al. | 364/900 |
| 4,783,648 | 11/1988 | Homma et al. | 340/724 |
| 4,860,219 | 8/1989 | Sleator | 340/727 X |
| 4,890,098 | 12/1989 | Dawes et al. | 340/721 |

OTHER PUBLICATIONS

Smith, R. G. and Carando P., "Structural Object Programming", Schlumberger, 1986.
Smith, R. G. et al., "A Substrate for Object-Oriented Interface Design," Schlumberger 1986.
K. Schmucker, Object-Oriented Programming for the MacIntosh, Chapter 2, *The Basics of Object-Oriented Programming,* pp. 15-35, Hayden Book Company, 1986.
M. Stefik et al., *Object-Oriented Programming: Themes and Variations,* AI Magazine, vol. 6, No. 4, pp. 40-62, 1986.
Inside MacIntosh, Addison-Wesley Publishing Company, Inc., 1985, vol. I, pp. 151-156.
D. Bobrow et al., *Common Lisp Object System Specification,* Journal of Lisp and Symbolic Programming, vol. 1, No. 4, Jun. 1988, X3J13 Document 88-002R, pp. 2-1 through 2-48.
M. Stefik et al., *Integrating Access-Oriented Programming into a Multiparadigm Environment,* IEEE Software, vol. 3, No. 1, Jan. 1986, pp. 10-18.
B. Stroustrup, *An Overview of C++,* ACM Sigplan Notices, vol. 21, No. 10, Oct., 1986, pp. 7-18.

*Primary Examiner*—David L. Clark
*Attorney, Agent, or Firm*—Charles D. Huston; Kenneth Olsen; Bruce D. Riter

[57] ABSTRACT

A declarative object-oriented approach to menu construction provides a mechanism for specifying the behavior, appearance and function of menus as part of an interactive user interface. Menus are constructed from interchangeable object building blocks to obtain the characteristics wanted without the need to write new code or code and maintaining a coherent interface standard. The approach is implemented by dissecting interface menu behavior into modularized objects specifying orthogonal components of desirable menu behaviors. Once primary characteristics for orthogonal dimensions of menu behavior are identified, individual objects are constructed to provide specific alternatives for the behavior within the definitions of each dimension. Finally, specific objects from each dimension are combined to construct a menu having the desired selections of menu behaviors.

24 Claims, 31 Drawing Sheets

OBJECT: (RULESET-CONTROL-MENU) ~600

SYNONYMS:

GENERALIZATIONS: (STICKYMULTIPLECHOICEMULTIMENU) ~605

GROUPS: MODIFIABLECLASSOBJECT RIDE

TYPE: CLASS

EDITED: 11-MAR-88 9:27:04 PST    BY: SCHOEN

VERBOSE[EXPR]: ("VERBOSE") ~615

ROLE: (MENUITEM) ~640

ORDER: (1) ~645

HELPSTRING: IF SET, RULE FUNCTIONS WILL PRINT STATUS MESSAGES DURING EXECUTION.

TRACE[EXPR]: ("TRACE") ~620

ROLE: MENUITEM

ORDER: 2

HELPSTRING: IF SET, RULESET EXECUTION WILL BE RECORDED IN A RULESET INSTANCE.

SUPPORT[EXPR]: ("SUPPORT") ~625

ROLE: MENUITEM

ORDER: 3

HELPSTRING: ("IF SET, OBJECTS AND SLOTS CREATED BY RULE" "EXECUTION WILL BE TAGGED WITH THE RULE" "RESPONSIBLE "FOR THEIR CREATION," "AND SLOT VALUES WILL BE TAGGED WITH THE" "RULE(S) RESPONSIBLE FOR THOSE VALUES.")

RULE-PAUSE[EXPR]: ("RULE PAUSE") ~630

FIG.6A

ROLE: MENUITEM

ORDER: 4

HELPSTRING: IF SET, EXECUTION WILL BE PAUSED AFTER EACH RULE ATTEMPT.

RULESET-PAUSE[EXPR]: ("RULESET PAUSE")~635

ROLE: MENUITEM

ORDER: 5

HELPSTRING: IF SET, EXECUTION WILL PAUSE AFTER EACH RULESET COMPLETES.

TITLE[TEXT]: (RULESET CONTROL SETTINGS)~610

MENULSTENTRY[EXPR]: ("RULESET CONTROL SETTING" #<GF TO #<VARIABLE-WIDTH-FONT HELVETICA.10 12F589B>>..

ORDER[EXPR]: AFTERCOMMANDMENUS

MATCH?[LISP]: IMPULSE/COMMANDMENU/MATCH?

FIG.6B

OBJECT: RULESET-CONTROL-MENU-126

SYNONYMS:

GENERALIZATIONS: RULESET-CONTROL-MENU — 705

GROUPS: DYNAMICALLYCREATEDINSTANCE

TYPE: INDIVIDUAL

EDITORS[OBJECT]: RULESET-EDITOR-122

WIDTH[EXPR]: 121

LISPWINDOW[EXPR]: #<WINDOW 115X65 AT (162,175) 1843583> — 715

SELECTION[EXPR]: (TRACE RULE-PAUSE RULESET-PAUSE) — 710

FIG.7

OBJECT: RULESET-STRATEGY-MENU-82

SYNONYMS:

GENERALIZATIONS: RULESET-STRATEGY-MENU — 1000

GROUPS: DYNAMICALLYCREATEDINSTANCE

TYPE: INDIVIDUAL

EDITORS[OBJECT]: RULESET-EDITOR-79

WIDTH[EXPR]: 126

LISPWINDOW[EXPR]: #<WINDOW 120X26 AT (245,297) 129F693> — 1010

SELECTION[EXPR]: CONTINUEAFTERFIRING — 1005

FIG.10

OBJECT: RULESET-STRATEGY-MENU — 900

SYNONYMS:

GENERALIZATIONS: STICKYSINGLECHOICEMULTIMENU — 905

GROUPS: MODIFIABLECLASSOBJECT RIDE

TYPE: CLASS

EDITED: 10-MAR-88 20:28:36 PST          BY: SCHOEN

RESTARTAFTERFIRING[EXPR]: "RESTART AFTER FIRING" — 915

ROLE: MENUITEM

ORDER: 1

HELPSTRING:   IF SET, RULE EXECUTION WILL RESTART WITH THE FIRST APPLICABLE RULE
        IN THE RULESET AFTER A SUCCESSFUL RULE FIRING.

CONTINUEAFTERFIRING[EXPR]: "CONTINUE AFTER FIRING" — 920

ROLE: MENUITEM

ORDER: 2

HELPSTRING:   IF SET, RULE EXECUTION WILL CONTINUE WITH THE NEXT APPLICABLE RULE
        AFTER A SUCCESSFUL FIRING.

TITLE[TEXT]: STRATEGY IN USE — 910

MENULSTENTRY[EXPR]:   ("STRATEGY IN USE" #<GF TO #<VARIABLE-WIDTH-FONT HELVETICA.
        10 12F589B>> ...)

ORDER[EXPR]:   AFTERCOMMANDMENUS

MATCH?[LISP]:   IMPULSE/COMMANDMENU/MATCH?

| OBJECT COMMANDS | OBJECTEDITOR: IMPULSE.GRAPHERDISPLAY |
|---|---|
| EDIT AS | OBJECT: GRAPHERDISPLAY |
| ◆ PROGENY | SYNONYMS: |
| ◆ ANCESTRY | GROUPS: METAIMPULSEEDITOR |
| KB STRUCT. GRAPHS | TYPE: CLASS |
| SHOW REFERENCES | EDITED: 27-FEB-88 16:21:58 PST    BY:   SCHOEN |
| RENAME OBJECT | FUNCTION[LISPVALUE]: |
| | SHOWGRAPHFN[LISPVALUE]:  SHOWGRAPHXYINDENT |
| | SHOWGRAPH[LISP]:   IMPULSE/GRAPHERDISPLAY/SHOWGRAPH |
| | GRAPH.ADDLINKFN[LISP]: |
| | GRAPH.ADDNODEFN[LISP]: |
| SLOT COMMANDS | GRAPH.DELETENODEFN[LISP]: |
| CREATE SLOT | GRAPH.DELETELINKFN[LISP]: |
| UNCACHED SLOTS | GENERATENODE[LISP]:   IMPULSE/GRAPHERDISPLAY/GENERATEGRAPHNODE |
| INSPECT VALUE | GENERATEGRAPH[LISP]:   IMPULSE/GRAPHERDISPLAY/GENERATEGRAPH |
| ◆ SETQ VALUE | GENERATELINK[LISP]:   IMPULSE/GENERATEGRAPHLINK |
| RENAME SLOT | |
| DELETE THIS SLOT | |

1105, 1110, 1115

OBJECT: (SLOTEDITORCOMMANDMENU) ~1300

SYNONYMS:

GROUPS: IMPULSEEDITOR MODIFIABLECLASSOBJECT

GENERALIZATIONS: (IMPULSECOMMANDMENU) ~1305

TYPE: CLASS (EDIT FACETS[EXPR]:) ~1350

HELPSTRING: STARTS THE FACET EDITOR ON THE CURRENT SLOT

ORDER: 8

ROLE: (MENUITEM SUBMENUITEM)

(INSPECT VALUE[EXPR]:) ~1325

HELPSTRING: INSPECTS THE VALUE OF THIS SLOT

ORDER: 3

ROLE: (MENUITEM SUBMENUITEM)

(MESSAGE[EXPR]:) ~1355

SUBMENU: MESSAGESUBMENU

HELPSTRING: SENDS A MESSAGE; DEFAULTS TO VALUE FACET, BUT MIDDLE BUTTON SHOWS ALL POSSIBLE RECEIVERS

ORDER: 9

ROLE: (MENUITEM SUBMENUITEM)

(SETQ VALUE[EXPR]:) ~1330

SUBMENU: SETVALUESUBMENU

HELPSTRING: SETS THIS SLOT'S VALUE

ORDER: 4

ROLE: (MENUITEM SUBMENUITEM)

(RENAME SLOT[EXPR]:) ~1335

HELPSTRING: LETS YOU RENAME THIS SLOT (OPTIONALLY RENAMES INHERITED SLOTS AS WELL)

FIG.13A

ORDER: 5

ROLE: (MENUITEM SUBMENUITEM)

(DISPLAY SLOT SUCCESSION[EXPR]:) ~ 1365

SUBMENU: SLOTSUCCESSIONSUBMEN

HELPSTRING: DISPLAYS A TREE OF OBJECTS LINKED BY THIS SLOT NAME

ORDER: 10

ROLE (MENUITEM SUBMENUITEM)

(DELETE THIS SLOT[EXPR]:) ~ 1340

HELPSTRING: DELETS THIS SLOT (AND OPTIONALLY INHERITED VERSIONS). REQUESTS CONFIRMATION VIA MENU.

ORDER: 6

ROLE: (MENUITEM SUBMENUITEM)

TITLE[TEXT]: (SLOT COMMANDS) ~ 1310

(SLOT SYNONYMS[EXPR]:) ~ 1370

HELPSTRING: LETS YOU ADD OR REMOVE SLOT SYNONYMS

ORDER: 11

ROLE: (MENUITEM SUBMENUITEM)

WIDTH[EXPR]: 160

DEFAULT: 250

DYNAMIC: NIL

ITEMSTOGRAY[EXPR]: -2

(CREATE SLOT[EXPR]:) ~ 1315

HELPSTRING: CREATES A NEW SLOT, PROMPTING FOR ITS NAME AND DATATYPE

FIG. 13B

ORDER: 1

(ROLE: MENUITEM )~1375

(UNCACHED SLOTS[EXPR]: )~1320

HELPSTRING: PUTS UP A MULTI-CHOICE MENU OF INHERITABLE SLOTS FOR THIS OBJECT

ORDER: 2

ROLE: (MENUITEM)

(BLANK[EXPR]:"" )~1345

HELPSTRING: THIS IS A NON-FUNCTIONAL SEPARATOR.

ORDER: 7

ROLE: (MENUITEM SUBMENUITEM)

MENULSTENTRY[EXPR]: ("SLOT COMMANDS"#<GF TO #<VARIABLE-WIDTH-FONT HELVETICA. 10 131BD2B>>...)

(MESSAGE TRACE[EXPR]: )~1360

ORDER: 9.5

ROLE: (MENUITEM SUBMENUITEM)

FIG.13C

FASTOBJECTEDITOR: IMPULSE.GRAPHERDISPLAY

OBJE
SYN
GENE
GROU
TYPE
EDITE
FUN
1400 — SHO
SHO
GRA
GRA
GRA
GRA
GEN
GEN

SLOT COMMANDS — 1405

<ABORT>

INSPECT VALUE

SETQ VALUE

RENAME SLOT

DELETE THIS SLOT

EDIT FACETS

MESSAGE

MESSAGE TRACE

DISPLAY SLOT SUCCESSION

SLOT SYNONYMS

DESCRIBE

AY ACTIVEREGION

BY: SCHOEN

WGRAPHXVINDENT

PHERDISPLAY/SHOWGRAPH

RAPHERDISPLAY/GENERATEGRAPHNODE
GRAPHERDISPLAY/GENERATEGRAPH

GENERATELINK[LISP]: IMPULSE/GENERATEGRAPHLINK

LAYOUTGRAPH[LISP]: IMPULSE/GRAPHERDISPLAY/LAYOUTGRAPH

MOTHERD[EXPR]:

FIG.14

OBJECT: SLOTEDITORASSUBCOMMANDMENU ~1500

SYNONYMS:

GENERALIZATIONS: SUBCOMMANDMENU SLOTEDITORCOMMANDMENU ~1505

GROUPS: IMPULSEEDITOR MODIFIABLECLASSOBJECT

TYPE: CLASS

EDITED: 12-NOV-86 07:20:15                BY: SMITH

CREATELISPWINDOW[LISP]:   (^) IMPULSE/MENUTOOLSMENU/CREATELISPWINDOW

WIDTH[EXPR]:   NIL

FIG.15

OBJECT: UNCACHEDSLOTSMENU

SYNONYMS:

GENERALIZATIONS: DYNAMICMULTICHOICEMENUTOOLSMENU

GROUPS: IMPULSEEDITOR NEWMENU

TYPE: CLASS

EDITED: 4-FEB-88 11:28:04 PST              BY: SCHOEN

ITEMS[LISP]: IMPULSE/UNCACHEDSLOTSMENU/ITEMS ~1805

TITLE[TEXT]:  UNCACHED SLOTS

CREATEEACHTIME[LISP]: T

FIG.18

OBJECT: (UNCACHEDSLOTSMENU) ~1900

SYNONYMS:

GENERALIZATIONS: (DYNAMICMULTICHOICEMENUTOOLSMENU) ~1905

GROUPS: IMPULSEEDITOR NEWMENU

TYPE: CLASS

EDITED: 4-FEB-88 11:28:04 PST    BY: SCHOEN

ITEMS[LISP]: (IMPULSE/UNCACHEDSLOTSMENU/ITEMS) ~1925

TITLE[TEXT]: UNCACHED SLOTS

CREATEEACHTIME[LISP]: T

1910 — (SELECT[LISP])(~): (IMPULSE/DYNAMICMENU/SELECT) ~1920

1930 — (SELECTIONFN[LISP](~): ) IMPULSE/COMMANDMENU/SELECTIONFN

CODE[LISP](~): (IMPULSE/MENU/CODE) ~1935

CREATELISPWINDOW[LISP](~):    IMPULSE/MENUTOOLSMENU/CREATELISPWINDOW

EXECUTE[LISP](~): (IMPULSE/CHOICEMENU/EXECUTE) ~1940

PARSESELECTION[LISP](~):   IMPULSE/MENUTOOLSMENU/PARSESELECTION

PARSESELECTION?[LISP](~):   NIL

INTERPRET-SELECTION[LISP](~): (IMPULSE/CHOIICEMENU/INTERPRET-SELECTION) ~1945

PASS-SELECTION-TO-OPERATION[EXPR](~): T

FIG.19

```
(DEFUN IMPULSE/UNCACHEDSLOTSMENU/ITEMS (MENUOBJECT SLOT FACET EDITOROBJECT EDITEE)
 ;; FROM VERSION OF 2-JAN-01 BY RGS [THE TIMESERVER STRIKES AGAIN]
 (DECLARE (IGNORE SLOT FACET))
 (EDITEELET EDITEE (KB OBJECT)
  (LET* ((SLOTEDITOR (COND ((_ GENERALIZATION? EDITOROBJECT 'SLOTEDITOR) EDITOROBJECT)
                           (T (CAR (GETVALUE? EDITOROBJECT 'SUBEDITORS)))))
         (UNCACHEDSLOTS (SET-DIFFERENCE
                         (RKBEVAL KB (RESETVAR SYS.POINTERFLG NIL
                                      (NSET-DIFFERENCE (LISTSLOTS* OBJECT)
                                                       (LISTSLOTS OBJECT)))))
                        (GETVALUE? SLOTEDITOR 'UNCACHEDSLOTS))))
   (COND (UNCACHEDSLOTS
          (NCONC (SENDAS MENU MENUOBJECT ITEMS NIL EDITOROBJECT EDITEE)
                 (SORT UNCACHEDSLOTS #'STRING-LESSP)))
         (T (SENDQ PROMPTWINDOW :PRINT NIL
             `($1 "THERE ARE NO INHERITABLE SLOTS FOR OBJECT" $BOLD
                  ,(OBJECTNAME OBJECT) $DEFAULT "" ,$1))
            NIL)))))
```

FIG.20

```
(DEFUN IMPULSE/DYNAMICMENU/SELECT
    (MENUOBJECT SLOT FACET EDITOROBJECT & OPTIONAL EDITEE ADDITIONALARGUMENTS)
  "INVOKE A DYNAMIC MENU."
  ;; FROM VERSION OF 19-JUL-86 BY RGS
  (DECLARE (SPECIAL MENUOBJECT)
           (IGNORE SLOT FACET))
  (SETQ EDITEE (IMPULSE/EDITOR/EDITEE EDITOROBJECT EDITEE))
  (RESETLST
    ;; NEED TO DELAY EVALUATION OF MENUOBJECT UNTIL AFTER IT HAS BEEN RESET AS AN INSTANCE.
    (RESETSAVE NIL (LIST #'(LAMBDA (ED EE AR)
                             (FUNCALL #'RMESSAGE? 'IMPULSE MENUOBJECT 'CLEANUP NIL
                                      (LIST ED EE AR )))
                         EDITOROBJECT EDITEE ADDITIONALARGUMENTS))
    (RESETSAVE (CURSOR T))
    (SETQ MENUOBJECT
          (SENDS MENUOBJECT CODE NIL' ((SUPEREDITOR, @EDITOROBJECT) (EDITEE, @EDITEE))))
    (LET ((LISPWINDOW (GETVALUE? MENUOBJECT 'LISPWINDOW)))
      (COND (LISPWINDOW
             (SENDS MENUOBJECT POPUP NIL EDITOROBJECT EDITEE ADDITIONALARGUMENTS)
             ;; NOTE THAT A MENU SELECTION CAN ALTER THE KNOWLEDGE BASE FOCUS
             ;; [E.G., NOTICE REMOTE KNOWLEDGE BASE]
             (LOOP
               (LET ((RESULT (UNWIND-PROTECT
                                 (SENDS MENUOBJECT INTERACT NIL
                                        EDITOROBJECT EDITEE ADDITIONALARGUMENTS)
```

(IF RESULT
  (LET ((RESULT (RSEND IMPULSE MENUOBJECT SELECTIONFN NIL
                 (COND ((SEND? MENUOBJECT PARSESELECTION? NIL EDITOROBJECT
                        EDITEE ADDITIONALARGUMENTS)
                       (SENDS MENUOBJECT PARSESELECTION NIL RESULT
                        EDITOROBJECT EDITEE ADDITIOANLARGUMENTS))
                       (T RESULT))
                 EDITOROBJECT EDITEE ADDITIONALARGUMENTS))))
    (CASE RESULT
      (: LOOP-PREVIOUS (RETURN : LOOP))
      (: LOOP)
      (T (RETURN RESULT)))))
  (RETURN NIL)))))))
  (SENDS MENUOBJECT CLEAR)
  (SENDS MENUOBJECT CLOSELISPWINDOW))))
```

FIG.21B

OBJECT: DYNAMICMENU

SYNONYMS:

GENERALIZATIONS: STATIC/DYNAMICMENU

GROUPS: METAIMPULSEEDITOR

TYPE: CLASS

EDITED: 27-MAR-86 11:36:58      BY: SMITH

POPUP[LISP]: NIL

QUERY[LISP]: NIL

CLEAR[LISP]: NIL

SELECT[LISP]: IMPULSE/DYNAMICMENU/SELECT    2205

2200 DOCUMENTATION[TEXT]: FOR A DYNAMICMENU, THERE IS NO POPUP MESSAGE HANDLER. THE INTERACT HANDLER IS ASSUMED TO TAKE CARE OF PUTTING THE MENU ON THE SCREEN. CLEAR AND QUERY ARE SIMILARLY ABSENT SINCE THERE IS NO MENU STATE TO BE MAINTAINED.

DONTDELETE[LISP]: NIL

FIG.22

```
(DEFUN IMPULSE/COMMANDMENU/SELECTIONFN
    (MENUOBJECT SLOT FACET SELECTION &OPTIONAL EDITOROBJECT EDITEE SELECTION-HISTORY)
  "EDITOROBJECT AND EDITEE WILL BE SET FOR THE SECOND (AND SUBSEQUENT) POPPED-UP MENUS IN
A SERIES OF POPPED-UP SUBMENUS."
  ;; FROM VERSION OF 2-JAN-01 BY RGS [TIME SERVER...]
  (DECLARE (IGNORE SLOT FACET)))
  (EVAL.AS.PROCESS
    (PROG1
      (CATCH : IMPULSE-ABORT-OPERATION
        (RKBEVAL 'IMPULSE
          (LET (OPERATION SUBMENU ITEM MOUSEBUTTON)
            (DECLARE (SPECIAL SUBMENU ITEM OPERATION MOUSEBUTTON))
            (CASE (SEND? MONUOBJECT CHOICETYPE)
              (SINGLECHOICE (SETQ MOUSEBUTTON (CDR SELECTION)
                             ITEM (CAR SELECTION)))
              (MULTICHOICE (SETQ MOUSEBUTTON (CDAR SELECTION)
                            ITEM (MAPCAR #'CAR SELECTION)))
              (T (ERROR "MENUS HAVE TO BE EITHER SINGLE OR MULTICHOICE: ~S"
                        (OBJECTNAME MENUOBJECT))))
  ;; THE USE OF BLANK AND BLANK1 BELOW IS A HACK.  IT ALLOWS FOR [UP TO TWO] BLANK
  ;; SEPARATORS IN COMMAND MENUS.  WITHOUT THIS CHECK, IMPULSE/GETOPERATIONHANDLER WOULD
  ;; GENERATE A PROMPTWINDOW MESSAGE ABOUT A MISSING METHOD.
            (COND ((AND ITEM (NOT (FMEMB ITEM '(BLANK BLANK1))))
                   (MULTIPLE-VALUE-BIND (EDITOR EDITEE SELECTION-HISTORY)
```

FIG.23A

```
(SENDS MENUOBJECT INTERPRET-SELECTION NIL
       EDITOROBJECT EDITEE
       (PUSH (MAKE-SELECTION
              :MENUOBJECT MENUOBJECT
              :ITEM ITEM
              :MOUSEBUTTON MOUSEBUTTON
              :PASS-TO-OPERATION
              (SEND? MENUOBJECT PASS-SELECTION-TO-OPERATION NIL
                     EDITOROBJECT EDITEE ITEM MOUSEBUTTON))
             SELECTION-HISTORY)))
;; IF THE MENUOBJECT SPECIFIES AN OPERATION INDEPENDENT OF ITS SELECTION, THEN
;; USE IT.  THIS COVERS THE USUAL CASE OF THE COMMANDARGUMENTMENU, WHICH HAS ONE
;; OVERRIDING OPERATION FOR ALL ITEMS.  IN THIS CASE, THE ITEM BECOMES THE FIRST
;; ARGUMENT
(SETQ OPERATION (SEND? MENUOBJECT OPERATION NIL EDITOR EDITEE SELECTION-HISTORY))
(COND ((AND (NOT (EQ (SELECTION-MOUSEBUTTON (CAR SELECTION-HISTORY)) 'LEFT))
            (SETQ SUBMENU (OBJECT?
                           (OR (SENDSLOT? MENUOBJECT ITEM SUBMENU
                                          EDITOR EDITEE SELECTION-HISTORY)
                               (SEND? MENUOBJECT SUBMENU NIL EDITOR EDITEE
                                      SELECTION-HISTORY)))))
       (SENDS SUBMENU SELECT NIL EDITOR EDITEE SELECTION-HISTORY))
      (OPERATION (SEND? MENUOBJECT EXECUTE NIL
                        OPERATION EDITOR EDITEE SELECTION-HISTORY))
      (T ITEM))))))
;; ENSURE THAT WE RESET THE ERROR INDICATOR WHEN AN ABORT OCCURS
(SETQ *RESETSTATE* NIL))))
```

FIG.23B

OBJECT: CHOICEMENU

SYNONYMS:

GENERALIZATIONS: COMMAND/CHOICEMENU

GROUPS: METAIMPULSEEDITOR NEWMENU

TYPE: CLASS

EDITED: 4-FEB-88 13:56:22 PST          BY: SCHOEN

SELECTION[EXPR]:

PARSESELECTION?[LISP]: NIL

OPERATION[EXPR]: CHOOSE

SELECTIONFN[LISP]: (~)IMPULSE/COMMANDMENU/SELECTIONFN

EXECUTE[LISP]: IMPULSE/CHOICEMENU/EXECUTE

INTERPRET-SELECTION[LISP]: IMPULSE/CHOICEMENU/INTERPRET-SELECTION

PASS-SELECTION-TO-OPERATION[EXPR]: T

RETURN-MOUSEBUTTON[EXPR]:

FIG.24

```
(DEFUN IMPULSE/MENU/CODE (MENUCLASS SLOT FACET SLOTLST &OPTIONAL REFETCHFLG)
  "CREATE OR FIND A MENUCLASS INSTANCE FOR AN EDITOR."
  ; FROM VERSION OF 21-JUL-86 BY RGS
  (DECLARE (IGNORE SLOT FACET))
  (LET ((SUPEREDITOR (CDR (FASSOC 'SUPEREDITOR SLOTLST)))
        (EDITEE (CDR (FASSOC "EDITEE SLOTLST)))
        MENUINSTANCE)
    (COND ((INDIVIDUAL? SUPEREDITOR)
           ;; BUILD AN INSTANCE OF MENUCLASS IN THE CONTEXT OF AN EDITOR.
           ;; CREATE A NEW MENUCLASS INSTANCE (OR FIND AN EXISTING INSTANCE) FOR SUPEREDITOR
           (COND ((SETQ MENUINSTANCE
                        (COND ((OR (INDIVIDUAL? MENUCLASS)
                                   (NOT (SEND? MENUCLASS INSTANTIATE? NIL SLOTLST)))
                               MENUCLASS)))
                  (SENDS MENUINSTANCE EDITORS AND SUPEREDITOR))
                 ((AND (NOT (SEND? SUPEREDITOR NEWMENU NIL SLOTLST))
                       (SETQ MENUINSTANCE (SEND? MENUCLASS MATCH? NIL NIL SLOTLST)))
                  (SENDS MENUINSTANCE EDITORS ADD SUPEREDITOR))
                 (T (SETQ MENUINSTANCE
```

FIG.25A

```
          (SENDS MENUCLASS CREATE NIL
                  '((EDITORS ,SUPEREDITOR)
                    ,@(REMOVE 'SUPEREDITOR SLOTLST : TEST #'EQ :KEY #'CAR))))))
   (WHEN MENUINSTANCE (SENDS SUPEREDITOR MENUS ADD MENUINSTANCE)))
  (T (SETQ MENUINSTANCE
           (COND ((OR (INDIVIDUAL? MENUCLASS)
                      (NOT (SEND? MENUCLASS INSTANTIATE? NIL SLOTLST)))
                  MENUCLASS)
                 (T (SENDS MENUCLASS CREATE NIL SLOTLST))))))
(COND (MENUINSTANCE
       (COND ((EQ REFETCHFLG 'SHAPE))
             (REFETCHFLG (SEND? MENUINSTANCE REFETCH NIL SUPEREDITOR))
             (T
              ;; THE CREATELISPWINDOW HANDLER IS RESPONSIBLE FOR CREATING A NEW LISPWINDOW,
              ;; INCLUDING TITLE. IT IS ALSO RESPONSIBLE FOR LINKING THE LISPWINDOW BACK TO
              ;; THE MENUINSTANCE.
              (SENDS MENUINSTANCE CREATELISPWINDOW NIL SUPEREDITOR EDITEE)))
       MENUINSTANCE)
      (T (ERROR "UNABLE TO CREATE OR FIND A MENU")))))
```

FIG.25B

```
(DEFUN IMPULSE/CHOICEMENU/EXECUTE (MENUOBJECT SLOT FACET OPERATION EDITOROBJECT EDITEE SELECTION-HISTORY)
  (DECLARE (IGNORE OPERATION FACET SLOT))
  (LET ((SELECTION (FIND-IF #'SELECTION-PASS-TO-OPERATION SELECTION-HISTORY)))
    (SENDS MENUOBJECT SELECTION PUT
      (IF (SEND? MENUOBJECT RETURN-MOUSEBUTTON NIL EDITOROBJECT EDITEE SELECTION-HISTORY)
          (CONS (SELECTION-ITME SELECTION)
                (SELECTION-MOUSEBUTTON SELECTION))
          (SELECTION-ITEM SELECTION)))))
```

FIG.26

```
(DEFUN IMPULSE/CHOICEMENU/INTERPRET-SELECTION (MENUOBJECT SLOT FACET EDITOROBJECT EDITEE SELECTION-HISTORY)
  (DECLARE (IGNORE FACET SLOT MENUOBJECT))
  (VALUES EDITOROBJECT EDITEE SELECTION-HISTORY))
```

FIG.27

OBJECT-ORIENTED FRAMEWORK FOR MENU DEFINITION

This application is a continuation of application Ser. No. 07/668,319, filed Mar. 13, 1991, now abandoned, which is in turn a continuation of application Ser. No. 07/195,129, filed May 17, 1988, now abandoned.

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Technical Field

The present invention relates to the fields of object-oriented programming and user interfaces for computers.

2. Background Art: Object-oriented Programming

Object-oriented programming structures are typically characterized by five features: objects, classes, inheritance, methods, and messages. Objects are typically a combination of the conventional programming notions of data and procedures. Objects that respond in the same way to the same messages are described at once by describing characteristics of a "class." Individual objects in a class having specific and unique data or procedures are referred to as "instances" of that class. The primary advantage of object-oriented programming is that new objects or classes ("descendants") can be created from existing objects or classes ("ancestors"), by merely referencing or "inheriting" desired behaviors from objects that already exhibit those behaviors without rewriting the objects completely. This gives rise to a hierachical inheritance structure wherein the parent class or classes in direct inheritance links are referred to as "immediate ancestors," the inheriting class referred to as the "immediate descendant." Procedures, referred to as "methods", govern the behavior and functionality of an object. Objects may contain their own references to methods, or they may inherit methods from their ancestors. Methods associated with an object in either way are invoked in response to named messages sent to that object. For a general discussion of object-oriented programming and the terminology see *Object-Oriented Programming for the Macintosh*, Kurt J. Schmucker, Hayden Book Company, 1986 and Object-Oriented Programming: Themes and Variations, Mark Stefik and Daniel G. Bobrow, *AI Magazine*, 6(4): 40-62, 1986.

3. Background Art: User Interfaces for Computers

Computer interfaces must perform a number of important tasks. First, they must provide a means for inspecting data. Second, they must provide a means for selecting data that is to be operated on. Finally, they must provide a method for choosing a command to operate on the selected data. Commands are typically chosen from lists of commands called menus and can often be classified into one of two types. Many commands result in immediate action, in which case they might be verbs or verb phrases (such as "delete"). Other commands specify an attribute of an object or set a value (such as the font for new text), in which case they may be nouns. However, sometimes it is desirable for the menu to display information and it is desirable to leave the menu displayed on the screen. At other times it may be desirable for the menu to disappear as soon as a choice is made. Further, the preferred position of a menu may differ from menu to menu, and some menus may permit the choice of multiple entries, while some may contain mutually exclusive selections. Because of the great variety of data types and commands used in applications no one menu meets the demands for every usage. There have been a large number of different types of menus developed to best meet these different objectives with differing degrees of success.

For example, menus in the Macintosh interface are discussed at pages 51-61 of *Inside Macintosh, Volumes* I, II, and III, Addison-Wesley Publishing Company, Inc., 1985. In the highly standardized Macintosh "pull-down" menu interface, the menus are not visible until they are chosen from the horizontal menu bar permanently displayed across the top of the screen. To choose a command, the user positions the pointer over the desired menu title and presses the mouse to highlight the title and display the menu. While holding down the mouse button, the user moves the pointer down the menu. As the pointer moves to each command, the command is highlighted. The command that is highlighted when the user releases the mouse button is chosen. As soon as the mouse button is released, the command blinks briefly, the menu disappears, and the command is executed. Macintosh menus have the advantage of being standardized so that once they have been learned, other applications using the same interface are easy to use. Further, they are very efficient in the use of display area. However, the fact that menus are displayed only when chosen and disappear as soon as a command is executed is undesirable when multiple entries are to be selected from a single menu. Further, the display of Macintosh menus requires the dedicated use of the mouse, which may be inconsistent with the users desire to use the mouse to edit or select other data while he is viewing a list of command choices that he has made. Further still, the pull down menu required extensive use of the mouse and numerous steps to be executed in order to select a menu option. Finally, Macintosh menus typically "pull-down" in a fixed position that covers the data window, unless the data window is moved. Thus, even though the Macintosh interface is highly standardized, is easy to learn, and uses display area efficiently, it has a number of disadvantages which result in its not being the preferred interface for many applications. This is especially the case in applications which execute on systems having larger displays where screen area is not at a high premium, or where more speed is desired in the selection of menu items.

Interactive graphics have been used in computer interfaces for some time. See for example, *A Conceptual Framework for the Augmentation of Man's Intellect*, Doug Engelbart, Vistas in Information Handling, edited by Howerton and Weeks, Spartan Books, Washington D.C. 1963. Interactive graphics was integrated into the Lisp environment in Interlisp, a programming language which began with an implementation of the Lisp programming language for the PDP-1 at Bolt, Beranek and Newman in 1966 and was later developed at Xerox Palo Alto Research Center ("PARC"). See *Interlisp Reference Manual*, Xerox Corporation, 1983. However the menu package available with Interlisp supported only a limited variety of menus, and did not provide for the easy modification of these menus. It did not support menus that had the capability of selecting multiple items from a single menu, did not provide any visual clue as to items selected, and menus could not be attached to a window so that they followed the window when the window was moved.

Thus, it is desirable to provide a menu package that permits the construction of a broad variety of different menu types to meet different needs, minimizes the amount of code that needs to be written to develop new menus, and standardizes the varying menus to the extent possible.

DISCLOSURE (SUMMARY) OF INVENTION

A large, flexible, and standardized suite of menus types are implemented by dissecting menu behavior into modularized objects specifying orthogonal components of desirable menu behaviors. In accordance with the preferred embodiment of the invention, primary characteristics for orthogonal dimensions of menu behavior are identified. Then, individual objects are constructed to provide specific desirable alternatives for the behavior within the definitions of each dimension. Finally, specific objects from each dimension are combined to construct a menu having the desired selections of menu behaviors.

This modular approach to menu construction allows construction of menus with just the characteristics wanted without the need to write new code or code that would dilute the interface standard.

BRIEF DESCRIPTION OF DRAWINGS

FIG. 6 illustrates the class object definition of a ruleset-control-menu object 500.

FIG. 7 is the object definition of an instance of ruleset-control-menu object 500 named ruleset-control-menu-126.

FIG. 9 illustrates the class object definition of a ruleset-strategy-menu object 800.

FIG. 10 is an object definition of an instance of a ruleset-strategy-menu object 800 named ruleset-strategy-menu-82.

FIG. 13 illustrates the class object definition of a sloteditorcommandmenu object 1205.

FIG. 14 is a reproduction of a window display associated with a fastobjecteditor in which commands "pop up" in response to selection of captions such as partially obscured caption 1400 in FIG. 14.

FIG. 15 illustrates the class object definition of a sloteditorassubcommandmenu object 1200.

FIG. 18 illustrates the class object definition of uncachedslotsmenu object 1700.

FIG. 19 illustrates the class object definition of uncachedslotsmenu object 1700 expanded to illustate inherited methods.

FIG. 20 illustrates a method impluse/uncachedslotsmenu/items which implements the Items message received by uncachedslotsmenu object 1700 and generates a list of items that appear in Uncached Slots menu 1600.

FIG. 21 illustrates a implulse/dynamicmenu/select method 2100 inherited by uncachedslotsmenu 1700 from dynamicmenu 205 which implements the Select message 1930 referred to in FIG. 19.

The class object definition of dynamicmenu 205 is illustrated in FIG. 22.

FIG. 23 illustrates an impulse/commandmenu/selectionfn method referred to in the selectionfn slot 1930 of FIG. 19.

FIG. 24 illustrates the class object definition of choicemenu 215 in FIG. 24.

FIG. 25 illustrates an impulse/menu/code method referred to in code slot 1935 of FIG. 19 which implements the code message.

FIG. 26 illustrates an impulse/choicemenu/execute method referred to in code slot 1940 of FIG. 19 which implements the execute message.

FIG. 27 illustrates an impluse/choicemenu/interpret-selection method referred to in code slot 1945 of FIG. 19 which implements the interpret-selection message.

Figure 28:
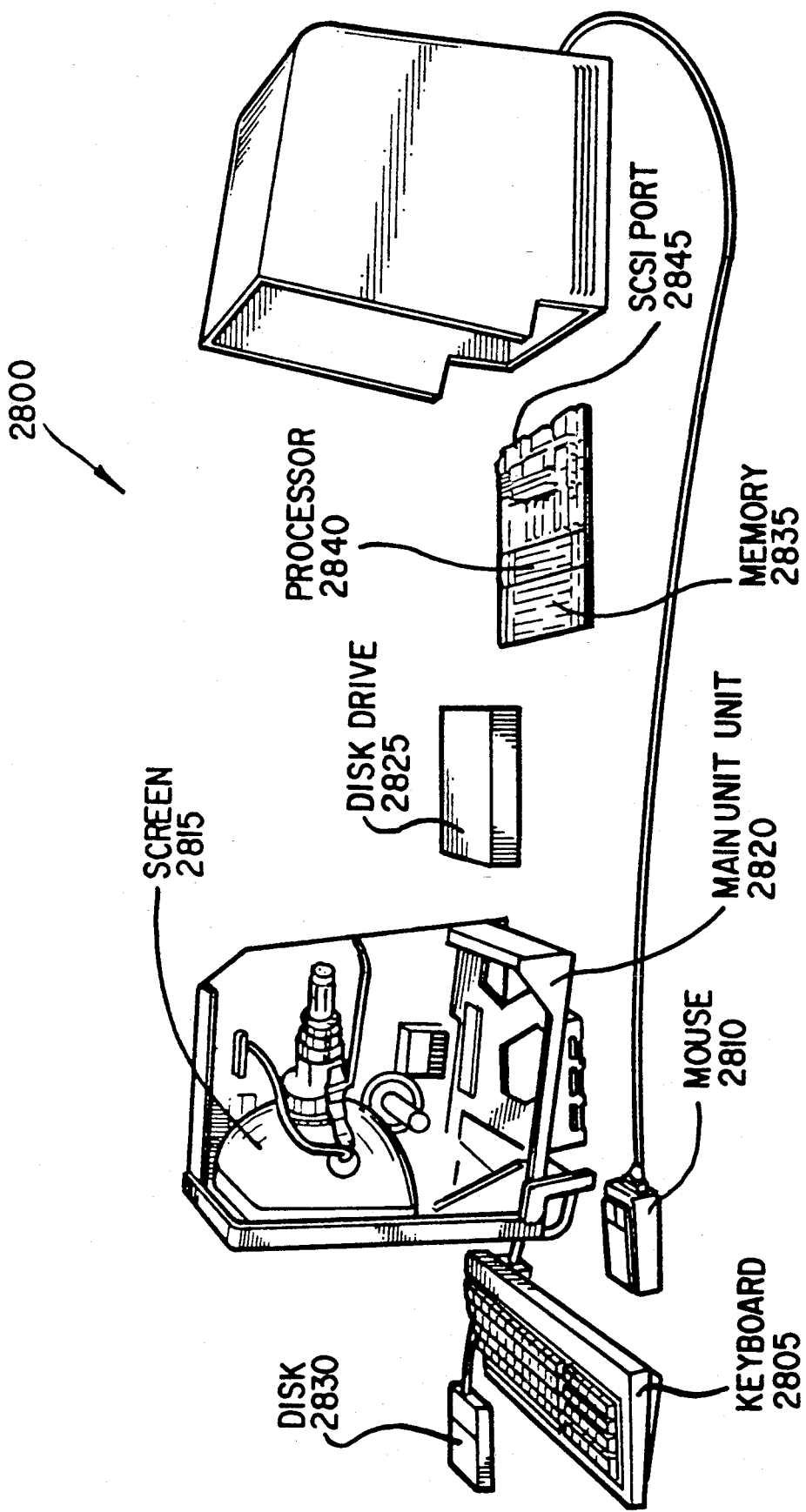

FIG. 28 is an illustration of a computer which includes a keyboard, a mouse, a screen, a main unit, a disk drive adapted to receive disks, a memory, a processor, and a Small Computer Standard Interface (SCSI) port.

DETAILED DESCRIPTION OF THE PREFERRED EMBODIMENT

Best Mode for Carrying out the Invention

According to a preferred embodiment of the invention a taxonomy of objects has been developed in an object-oriented programming environment that allows a programmer to develop custom menus for a user interface. (Taxonomy refers to the organizing of classes so that they can inherit methods and properties from other classes.) This permits a large variety in the available menu characteristics so that a menu can be optimized for its task, minimizes the amount of new code that must be written to develop a menu, and maintains a standard look and feel to the interface across a number of differing menus.

These and other advantages and features of the invention will become readily apparent to those skilled in the art after reading the following detailed description of the invention and studying the accompanying drawings.

The preferred embodiment of the present invention is a system implemented in an object-oriented extension to the Common Lisp language referred to as Strobe and uses an extension referred to as Impulse-86 as a framework for the construction of the user interface. These extensions are described in *Structured Object Program-* ming in *Strobe*, Schlumberger-Doll Research, December 1986 and *A Substrate for Object-Oriented Interface Design*, Smith, Barth and Young in *Research Directions in Object-Oriented Programming*, B. Shriver and P. Wagner (Editors) MIT Press 1987. The Common Lisp language is described in *Common LISP: The language*, Steele, Digital Press, 1984.

The preferred embodiment of the present invention uses a declarative approach particularly useful in interactive computer environments such as Lisp and Prolog for development and programming as new menus and programs can be created while the program is running. The preferred embodiment has been implemented in Common Lisp running on systems such as Sun workstations, Symbolics machines, TI Explorer Lisp machines, and Dec VAX workstations. For example, the present invention could be loaded into the memory and executed on a computer such as computer 2800 illustrated in FIG. 28, which includes a keyboard 2805, a mouse 2810, a screen 2815, a main unit 2820, a disk drive 2825 adapted to receive disks such as disk 2830, a memory 2835, a processor 2840, and a Small Computer Standard Interface (SCSI) port, 2845.

MENU TYPES

In accordance with the preferred embodiment of the present invention the alternative characteristics of menu behavior are divided into five (5) orthogonal dimensions. These dimensions are preferably independent of one another, or "orthogonal," so that changing the behavior of a menu in one dimension does not change or affect the behavior of the menu in another dimension. Specific alternative behaviors have been constructed for each dimension from which the characteristics of a particular menu can be chosen. By choosing one alternative behavior from each dimension a complete definition of menu behavior can be made without writing any new code. Objects that implement one such framework of multidimensional menu behvior have been developed and are described in the following discussion of the preferred embodiment.

Figure 1:
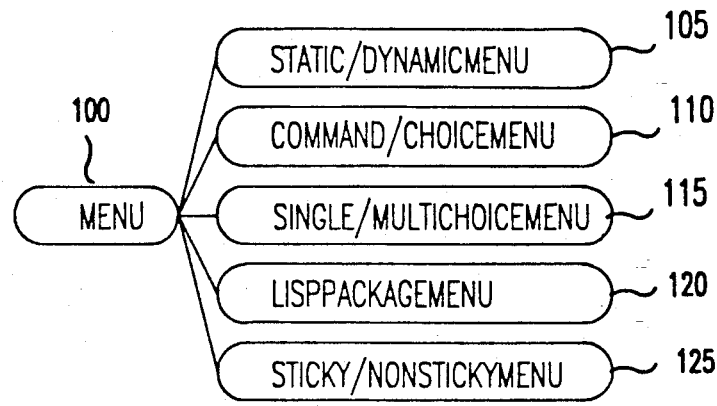
FIG. 1 is a graph illustrating a generalized taxonomy of menu types starting with a menu object 100 and its five (5) immediate descendants.

FIG. 1 is a graph illustrating a generalized taxonomy of menu types starting with a menu object 100 and its five (5) immediate descendants. These five (5) descendant objects correspond to five (5) orthogonal dimensions of menu behavior. These dimensions include static/dynamicmenu 105, command/choicemenu 110, single/multichoicemenu 115, lisppackagemenu 120, and sticky/nonstickymenu 125. These dimensions are explained below by describing the possible alternate behaviors associated with each dimension.

Figure 2:
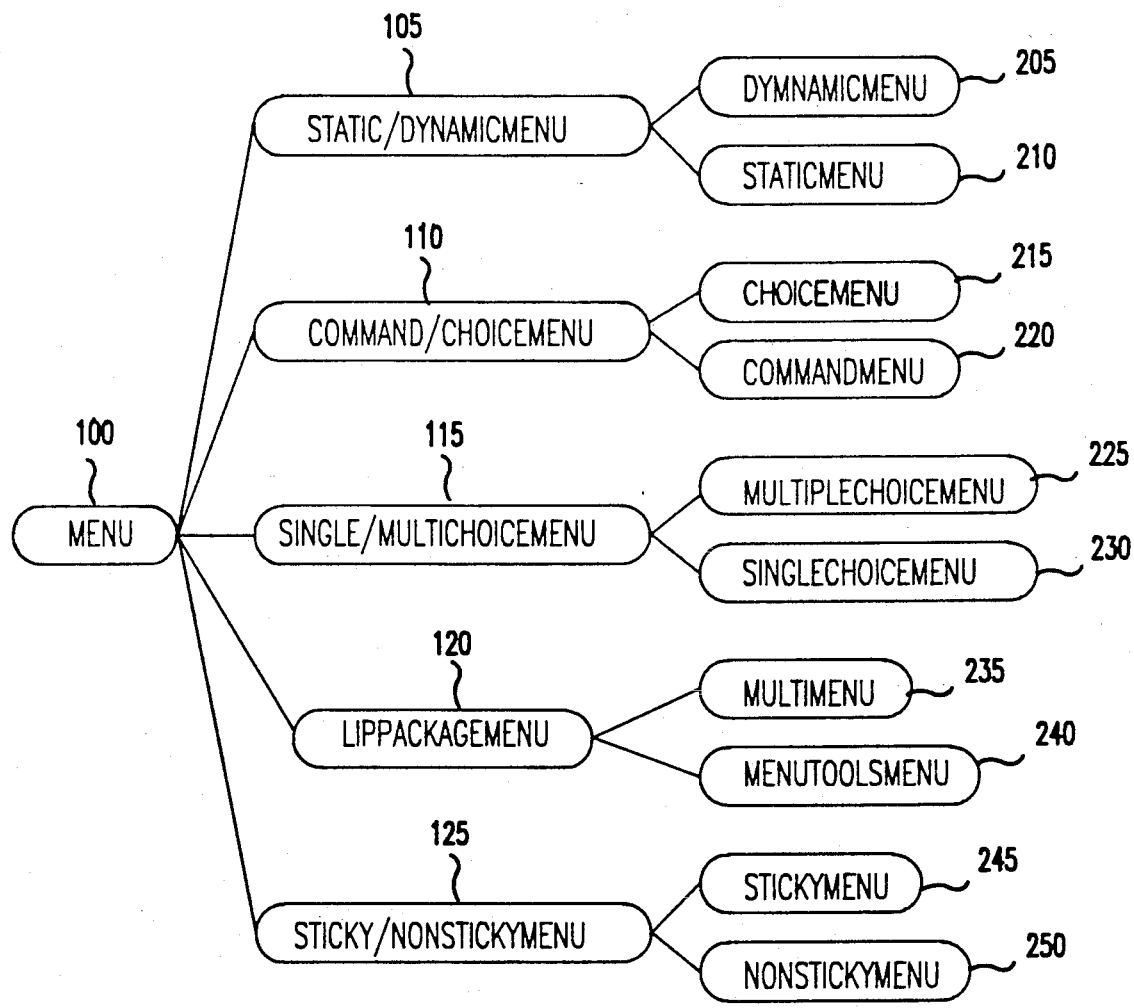
FIG. 2 is a graph illustrating the generalized menu object 100 and two generations of descendants.

FIG. 2 is a graph illustrating generalized menu object 100 and two generations of its descendants. This graph defines the alternative choices of behaviors available in the preferred embodiment for each of the five dimensions of menu behavior. Static/dynamicmenu 105 has two (2) immediate descendants which define the two (2) alternatives for behavior in this dimension. A dynamicmenu object 205 defines menu object behavior that "pops up" a menu in response to a command and erases the menu after a command has been selected from that menu. Dynamic menus are particularly well adapted for menus which are used infrequently and need not be visible permanently, thus freeing up display area. The alternative behavior is defined by a staticmenu object 210 which defines the behavior of a menu which stays on the screen under program control. Static menus are particularly well adapted for use with commands that are issued frequently or in menus that impart information.

Command/choicemenu 110 has two (2) immediate descendants which define the two (2) alternatives for behavior in this dimension. A choicemenu object 215 defines menu object behavior designed to choose values such as the selection of a font or other attribute. The alternative behavior is defined by a commandmenu object 220 which defines a menu behavior designed for issuing commands.

Single/multichoicemenu 115 has two (2) immediate descendants which define the two (2) alternatives for behavior in this dimension. A multiplechoicemenu object 225 defines menu object behavior that is characterized by the ability to select more than one item on the list of menu items and typically provides from the "unselection" of items before values are returned to the program. In the preferred embodiment, dynamic multiple choice menus are characterized by a "<done>" entry and the menu is displayed until the <done> item is selected. In response to a selection of the <done> item the set of selections is returned to the calling program. Alternatively, selection of an "<abort>" entry causes the return of an empty set. Multiple choice menus are particularly well adapted for use when multiple selections are to be returned from a single menu. The alternative behavior is defined by a singlechoicemenu object 230 which defines menu behavior of a menu object that permits the selection of only one menu item and "unselects" any previously selected item in response to the selection of a new item. Single choice menus are particularly well adapted for use with commands that cause immediate action or return only a single value.

Lisppackagemenu 120 has two (2) immediate descendants which consist of object-oriented interfaces to non-object-oriented menu programs. These two (2) descendants define the two (2) alternatives for behavior in this dimension. A multimenu object 235 provides an interface to a menus program that defines an "attached" menu behavior. Attached menus are positioned immediately adjacent to a main window and move when the main window is moved so as to remain attached. Attached menus are particularly well adapted for use with static menus associated with editing operations contained in the main window. The visual juxtaposition provides a strong correlation between the window and the menu and minimizes the distance that the eye and pointer must travel to find and select menu items from a permanent menu. The alternative behavior is defined by a menutoolsmenu object 240 which provides an interface to a menu program that creates menus that appear at the current location of the cursor. These menus are referred to as "stand-alone" menus. Stand-alone menus are particularly well adapted for use with dynamic menus which appear only long enough for interaction with the menu. By displaying the menu at the current cursor position the amount of eye and pointer movement required to find and select menu items is minimized.

Sticky/nonstickymenu 125 has two (2) immediate descendants which define the two (2) alternatives for behavior in this dimension. A stickymenu object 245 defines menu object behavior is characterized by active selections remaining highlighted (displayed differently, e.g., inverted, underlined, boxed, etc.) after a selection has been made. This behavior is particularly useful with static choice menus which must display the last selections to provide a context for future actions. The alternative behavior is defined by a nonstickymenu object 250 which defines menu behavior of a menu object wherein no visual record of selections is maintained. Nonsticky menus are particularly well adapted for use with static command menus for which no history of previous selections is needed.

Figure 3:
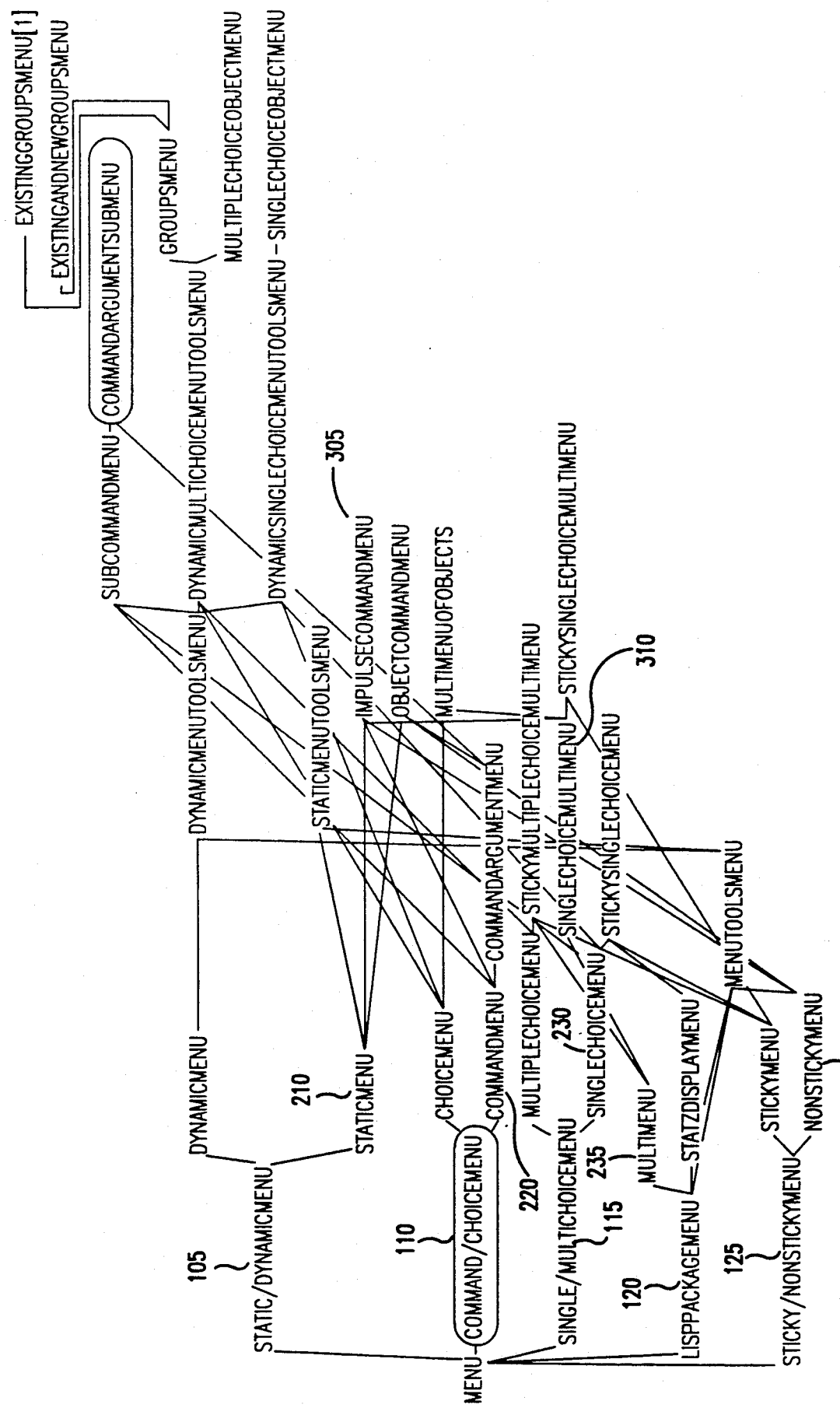
FIG. 3 is a graph illustrating the menu object of FIGS. 1 and 2 and multiple levels of its descendants.

FIG. 3 is a graph illustrating menu object 100 of FIGS. 1 and 2 and multiple levels of its descendants. The objects of the third and succeeding levels generally reference one ancestor from each dimension and combine behaviors in specific manners. For example, an impulsecommandmenu object 305 references one behavior from each dimension. Specifically, it references staticmenu 210 from static/dynamicmenu dimension 105, commandmenu 220 from the command/choicemenu dimension 110, nonstickymenu 250 from sticky/nonstickymenu dimension 125, and singlechoicemultimenu 310. Singlechoicemultimenu 310 is an intermediate object which references singlechoicemenu 230 from single/multichoicemenu dimension 115 and multimenu 235 from lisppackagemenu dimension 120.

MENU EXAMPLES

The preferred embodiment of the present invention will be further described by discussing specific examples of menus that can be constructed in accordance with the modular concepts described above, the specific inheritance structures used to construct the examples, and the specific object definitions which implement the inheritance structures. Finally, a description of certain procedures characteristic of the preferred embodiment will be provided.

Ruleset Control Settings Menu

Figure 4:
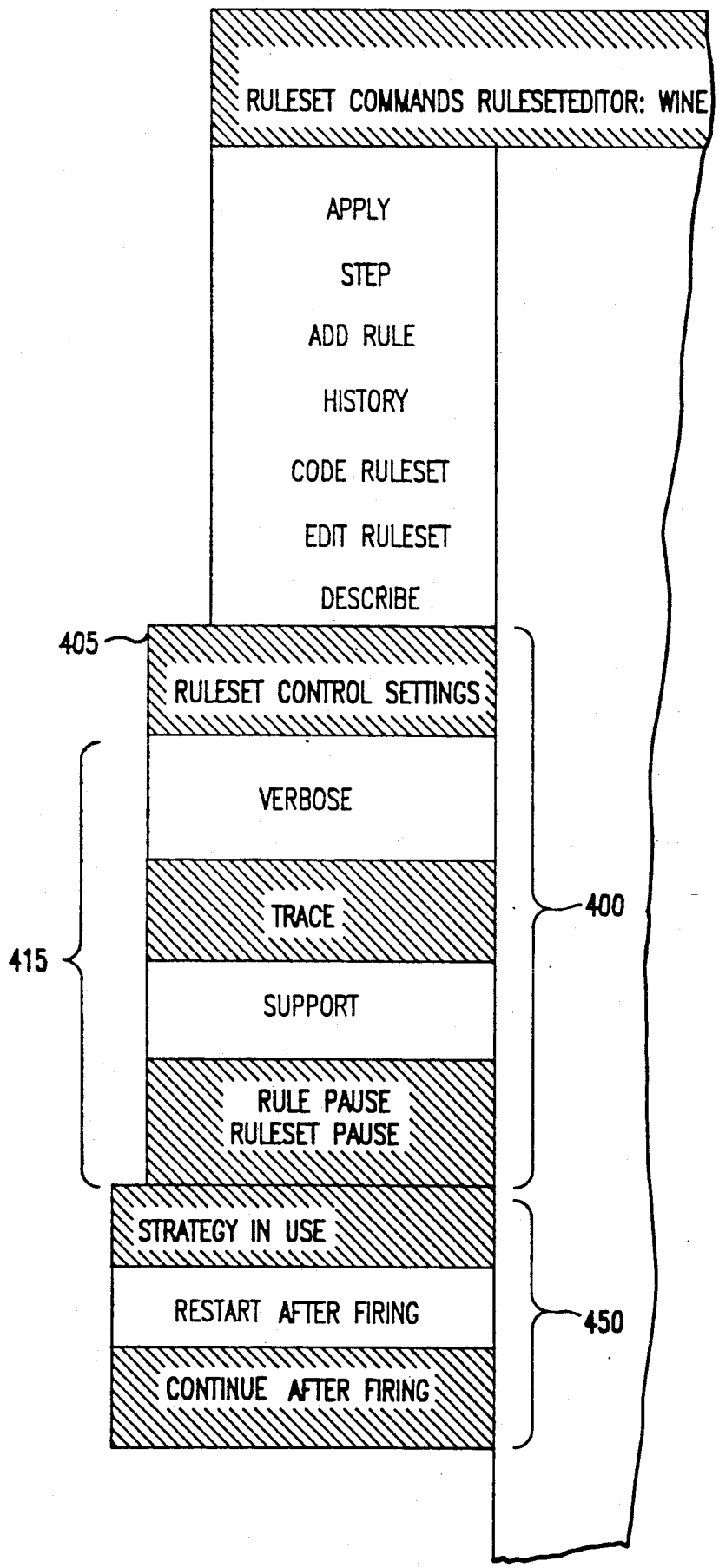
FIG. 4 is a reproduction of a number of actual menu displays generated in accordance with the preferred embodiment of the present invention.

FIG. 4 is a reproduction of a number of actual menu displays generated in accordance with the preferred embodiment of the present invention. Particularly, the three (3) menus displayed are associated with an Impulse-86 editor named ruleseteditor, which permits the examination of a component of a knowledge base or expert system known as a ruleset. Of immediate interest is a menu 400 which is used to choose a set of options that control the behavior of the ruleset. This menu is titled Ruleset Control Settings 405 and contains a number of menu items 415, of which the Trace, Rule Pause, and Ruleset Pause options have been selected. The object that controls this menu inherits behaviors from staticmenu 210, choicemenu 215, multiplechoicemenu 225, multimenu 235, and stickymenu 245.

Figure 5:
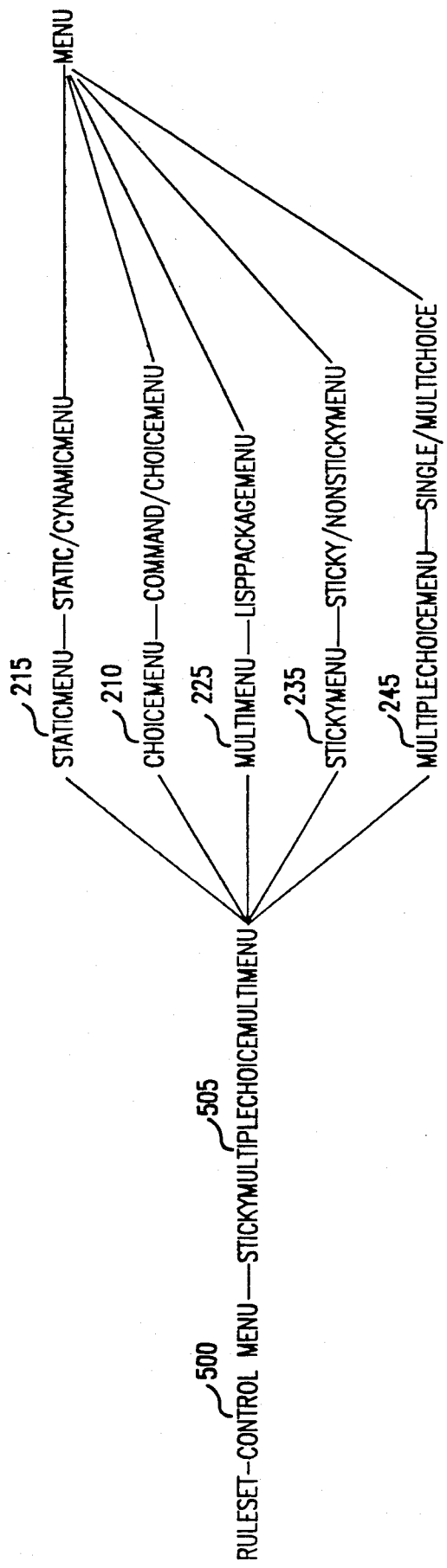
FIG. 5 is a graph showing the taxonomy of a specific ruleset-control-menu menu object 500, with the ancestors illustrated to the right of the object.

FIG. 5 is a graph showing the taxonomy of a ruleset-control-menu object 500, with the ancestors illustrated to the right of the object. An instance of this class object generated menu 400 illustrated in FIG. 4. The specific structure by which ruleset-control-menu 500 inherits its unique behavior can be appreciated from inspection of this graph. For example, ruleset-control-menu 500 is an immediate descendant of stickymultiplechoicemultimenu 505, which is in turn an immediate descendant of choicemenu 215, staticmenu 210, multiplechoicemenu 225, multimenu 235 and stickymenu 245. These last five (5) objects define the specific behaviors in the five dimensions. In this example, stickymultiplechoicemenu 505 is an intermediate menu that combines certain aspects of behavior, and ruleset-control-menu 500 inherits these behaviors and adds further specifics including the title of the menu and the names of items in the menu list. This permits other menus to be descended from stickymultiplechoicemultimenu 505 without the need to write code other than as may be necessary to specify a new title and a new set of items.

FIG. 6 illustrates the class object definition of a ruleset-control-menu object 500. The name of the object, "ruleset-control-menu," is indicated in the "OBJECT" slot 600. The immediate ancestors of ruleset-control-menu object 500 are indicated in the "GENERALIZATIONS" slot 605. In this case, the single immediate ancestor of ruleset-control-menu object 500 is stickymultiplechoicemultimenu 505, as consistent with the graph illustrated in FIG. 5. The title of the menu "Ruleset Control Settings" 405 illustrated in FIG. 4 is indicated in "TITLE" slot 610 and menu items 415 illustrated in FIG. 4 are indicated in slots 615, 620, 625, 630 and 635. Each menu item slot is characterized by a role and an order facet, such as role facet 640 and order facet 645, both associated with "Verbose" slot 615. Role facet 640 identifies the slot as contributing to the item list of the menu. Order facet 645 defines the position of the slot (first). The function of other slots, such as title slot 610, are also identified by their name, value and facets, and are treated accordingly.

FIG. 7 is an object definition of an instance of a ruleset-control-menu object 500 named ruleset-control-menu-126. Particularly, ruleset-control-menu-126 is the instance responsible for displaying menu 400 titled "Ruleset Control Settings" in FIG. 4. As indicated in FIG. 7, ruleset-control-menu-126 has a single generalization, ruleset-control-menu 500, as indicated in line 705. The three current selections, Trace, Rule-Pause, and Ruleset-Pause are indicated in slot 710, and are highlighted in display area 415 of FIG. 4. Finally, the specific window in which the menu is displayed is indicated in Lispwindow slot 715. For example, the entry "(162,175)" identifies the position of the upper left corner of the window and "115×65" indicates the width and height of the window.

Strategy in Use Menu

FIG. 4 also illustrates a menu titled "Strategy in Use Menu" 550. The menu object responsible for this display is similar to ruleset control settings menu object 500 except that it is a single choice menu rather than a multiple choice menu. This behavior is required because the items in this menu are mutually exclusive options.

Figure 8:
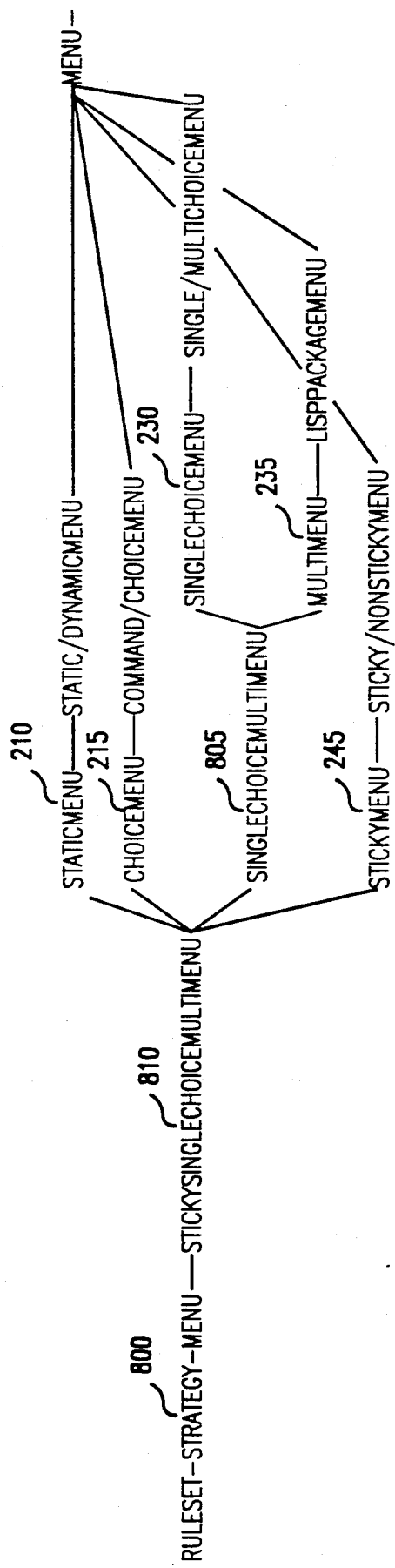
FIG. 8 is a graph showing the taxonomy of a ruleset-strategy-menu object 800, with the ancestors illustrated to the right of the object.

FIG. 8 is a graph showing the taxonomy of a ruleset-strategy-menu object 800, with the ancestors illustrated to the right of the object. An instance of this class object generated menu 450 titled "Strategy in Use" illustrated is in FIG. 4. Again, the specific structure by which ruleset-strategy-menu 800 inherits its unique behavior can be appreciated from inspection of this graph. Specifically, ruleset-strategy-menu 800 is an immediate descendant of stickysinglechoicemultimenu 810, which is an immediate descendant of choicemenu 215, staticmenu 210, stickymenu 245, and singlechoicemultimenu 805 (an intermediate object), which is an immediate descendant of singlechoicemenu 230 and multimenu 235.

As compared to ruleset-control-menu 500, ruleset-strategy-menu 800 inherits the same behaviors from choicemenu 215, staticmenu 210, stickymenu 245, and multimenu 235. However, ruleset-strategy-menu 800 inherits the behavior of singlechoicemenu 230 rather than the behavior of multiplechoicemenu 235. This is the behavior required to set the value of a control variable whose values define mutually exclusive options.

Thus, a new menu has been constructed without the need to write any new code, and the look and feel of the menus are otherwise standardized.

FIG. 9 illustrates a class object definition of ruleset-strategy-menu 800. The name of the object, "ruleset-strategy-menu," is indicated in the "OBJECT" line 900. The immediate ancestors of ruleset-strategy-menu 800 are indicated in the "GENERALIZATIONS" line 905. The immediate ancestor of ruleset-strategy-menu 800 is stickysinglechoicemultimenu 810 as consistent with the graph illustrated in FIG. 8. The title of the menu "Strategy in Use" illustrated in display 450 of FIG. 4 is indicated in "TITLE" slot 910 and menu items illustrated in display area 450 of FIG. 4 are indicated in slots 915 and 920 in the same manner as described with regard to ruleset-control-menu 500.

FIG. 10 is an object definition of an instance of a ruleset-strategy-menu object 800 named ruleset-strategy-menu-82. Particularly, ruleset-strategy-menu-82 is the instance responsible for displaying menu 450 titled "Strategy in Use" in FIG. 4. As indicated in FIG. 10, ruleset-strategy-menu-82 has a single generalization, ruleset-strategy-menu 800, as indicated in line 1000. The current selection, Continueafterfiring, is indicated in slot 1005, and is highlighted in display area 450 of FIG. 4. Finally, the specific window in which the menu is displayed is indicated in Lispwindow slot 1010. For example, the entry "(245,297)" identifies the position of the upper left corner of the window and "120×26" indicates the width and height of the window.

Slot Commands Menus

Figure 11B:
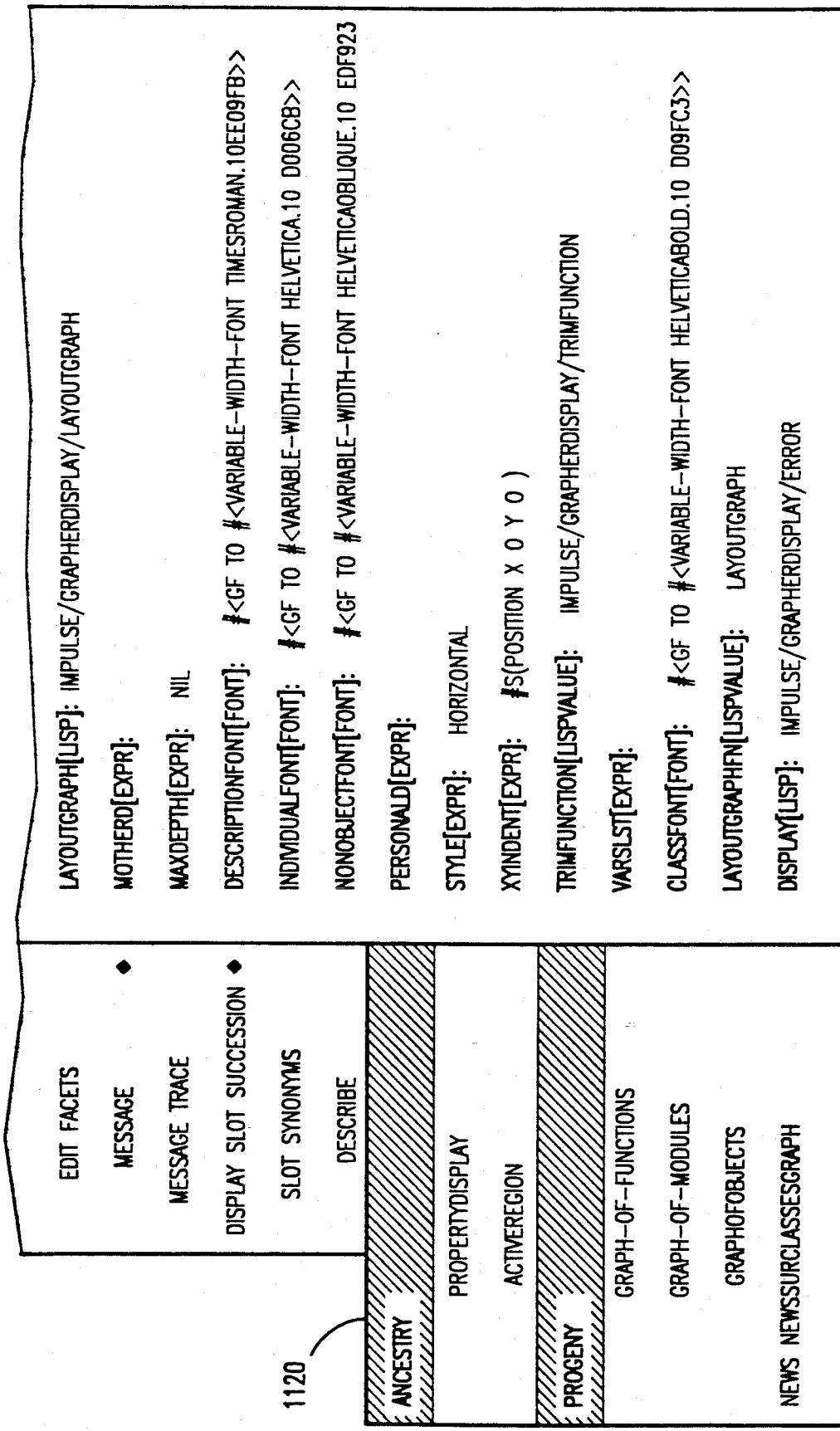
FIG. 11 is a reproduction of a window display associated with an Objecteditor, an editor in Impulse-86 used to edit Strobe objects, and four menus associated with it.

FIG. 11 is a reproduction of a window display associated with an Objecteditor, an editor in Impulse-86 used to edit Strobe objects, and four menus associated with it. A display window 1105 is associated with Objecteditor and displays the structure of an object titled "Grapherdisplay." Attached to window 1105 are four (4) menus, Object Commands 1110, Slot Commands 1115, Ancestry 1120, and Progeny 1125.

Figure 12:
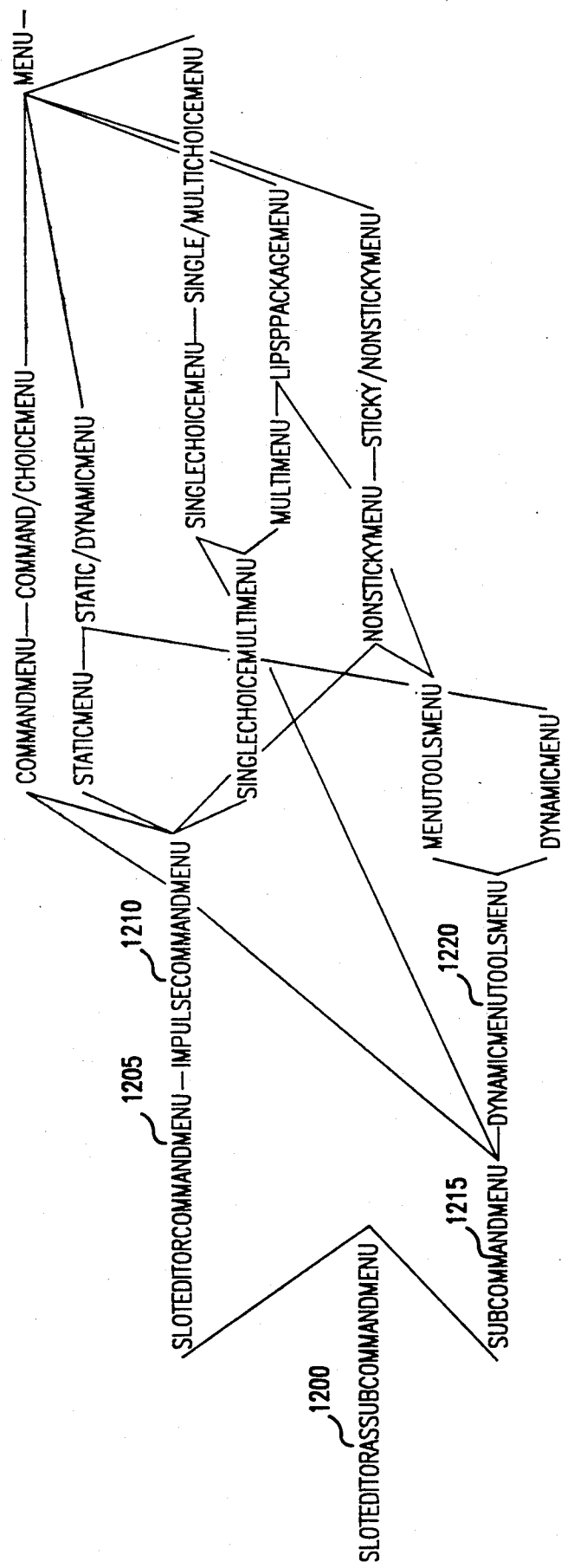
FIG. 12 is a graph showing the taxonomy of a sloteditorassubcommandmenu object 1200.

FIG. 12 is a graph showing the taxonomy of a sloteditorassubcommandmenu object 1200. One of the immediate ancestors of sloteditorassubcommandmenu 1200, sloteditorcommandmenu 1205, generated menu 1115 titled "Slot Commands" illustrated in FIG. 11. As can be seen from the graph in FIG. 12, sloteditorcommandmenu 1205 is complete in the sense that it inherits a behavior from each of the five dimensions.

FIG. 13 illustrates the class object definition of a sloteditorcommandmenu object 1205. The name of the object, "sloteditorcommandmenu," is indicated in the "OBJECT" line 1300. The immediate ancestors of sloteditorcommandmenu 1205 are indicated in the "GENERALIZATIONS" slot 1305. The immediate ancestor of sloteditorcommandmenu 1205 is impulsecommandmenu 1210 as consistent with the graph illustrated in FIG. 12. The title of the menu "Slot Commands" illustrated in display 1115 of FIG. 11 is indicated in "TITLE" slot 1310. Menu items are defined by SLOTS having by indented ROLE facets, such as SLOT 1315 and ROLE facet 1375, which has a "MENUITEM" arguement. The other menu items illustrated in display area 1115 of FIG. 11 are defined by slots 1320, 1325, 1330, 1335, 1340, 1345, 1350, 1355, 1360, 1365, and 1370.

FIG. 14 is a reproduction of a window display associated with a fastobjecteditor in which commands "pop up" in response to selection of captions such as partially obscured caption 1400 in FIG. 14. The Slot Commands menu 1405 is similar to Slot Command menu 1115 except that it is a dynamic menutools menu rather than a static multimenu menu. This menu is easily developed from the previously existing menu object as follows.

Referring again to FIG. 12, the taxonomy of a sloteditorassubcommandmenu object 1200 is shown. In this case, even though multimenu, which provides an "attached" behavior, is an ancestor through sloteditorcommandmenu 1205, sloteditorassubcommandmenu 1200 inherits the "pop up" behavior through its other immediate ancestor, subcommandmenu 1215. This is a result of subcommandmenu 1215 being the first or "primary" generalization as explained below.

FIG. 15 illustrates the class object definition of sloteditorassubcommandmenu object 1200. The name of the object, "sloteditorassubcommandmenu," is indicated in the "OBJECT" line 1500. The immediate ancestors of sloteditorassubcommandmenu 1200 are indicated in the "GENERALIZATIONS" line 1505. Since subcommandmenu (1215) is the first or "primary" generalization, the behaviors of subcommandmenu 1215 have precedence over the behaviors of other generalizations. Thus, sloteditorassubcommandmenu object 1200 inherits the dynamic and menutools behaviors from subcommandmenu 1215 rather than the static and multimenu behaviors from sloteditorcommandmenu 1205.

Uncached Slots Menu

Figure 16:
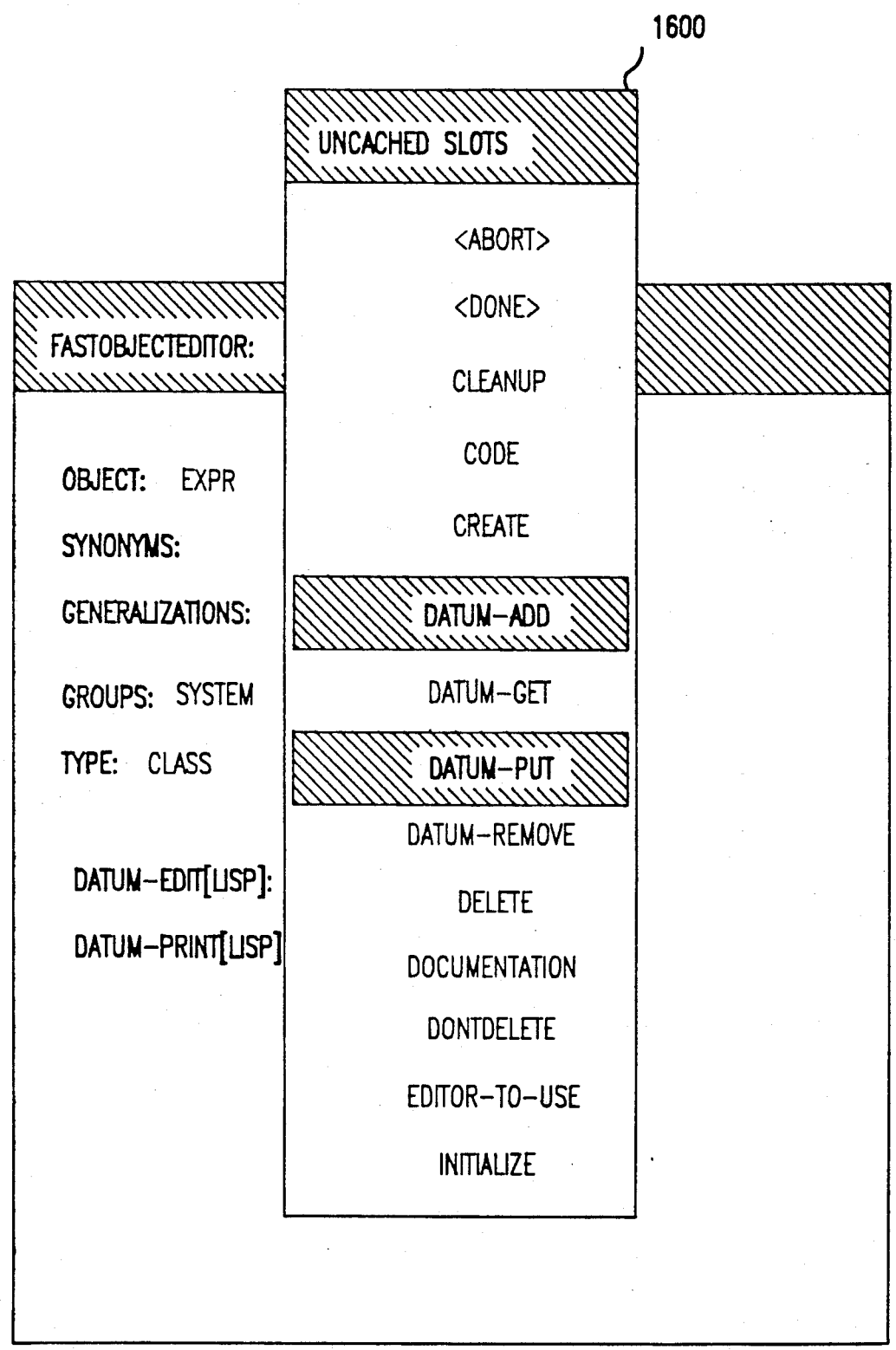
FIG. 16 is a reproduction of a pop up window display 1600 titled Uncached Slots.

FIG. 16 is a reproduction of a pop up Uncached Slots Menu 1600 titled Uncached Slots. This is a dynamic choice menu associated with fastobjecteditor, another editor used for editing the structure of objects in Strobe.

Figure 17:
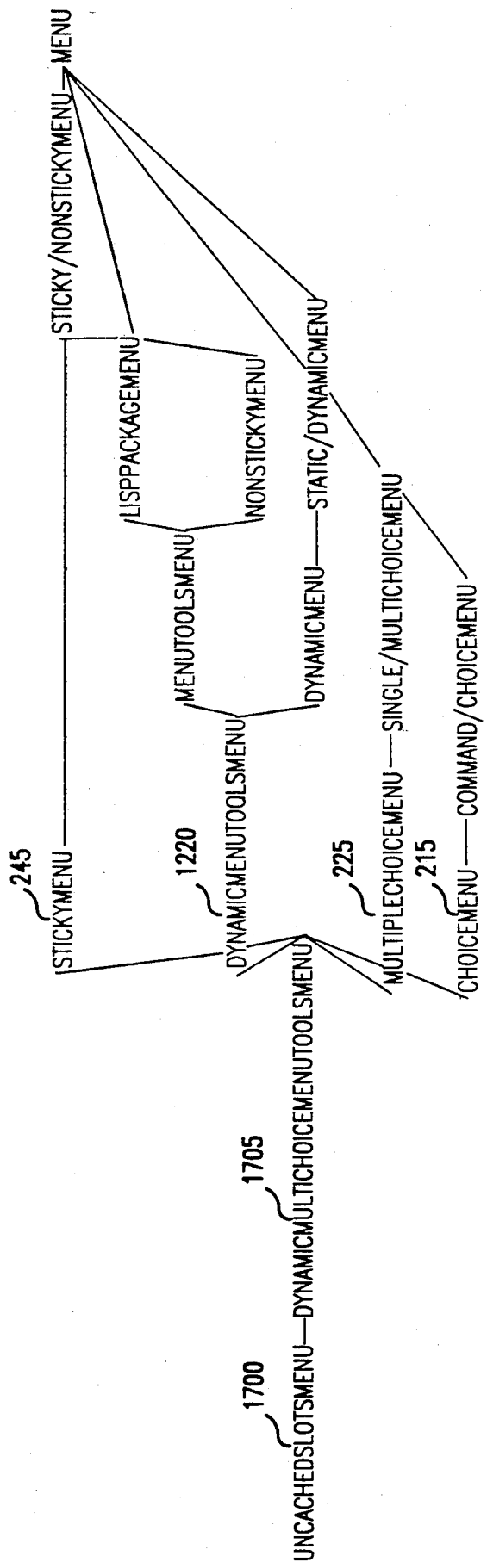
FIG. 17 is a graph showing the taxonomy of a uncachedslotsmenu object 1700, with the ancestors illustrated to the right of the object.

FIG. 17 is a graph showing the taxonomy of an uncachedslotsmenu object 1700, with the ancestors illustrated to the right of the object. An instance of this class object generated Uncached Slots Menu 1600 illustrated in FIG. 16. The specific structure by which uncachedslotsmenu object 1700 inherits its unique behavior can be appreciated from inspection of this graph. Specifically, uncachedslotsmenu object 1700 is an immediate descendant of dynamicmultichoicemenutoolsmenu 1705, which is an immediate descendant of stickymenu 245, dynamicmenutoolsmenu 1220, multiplechoicemenu 225, and choicemenu 215.

FIG. 18 illustrates the class object definition of uncachedslotsmenu object 1700. Because the items are potentially different each time this menu is invoked, the items are generated by a method impulse/uncachedslotsmenu/items indicated in items slot 1805 which computes the items list.

FIG. 19 illustrates the class object definition of uncachedslotsmenu object 1700 expanded to illustrate inherited methods. The name of the object, "uncachedslotsmenu," is indicated in the "OBJECT" line 1900. The immediate ancestor of uncachedslotsmenu 1700, dynamicmultichoicemenutoolsmenu (1705) is indicated in the "GENERALIZATIONS" line 1905 as consistent with FIG. 17.

The "( ∧ )" symbol indicates that the method referred to in a named message is inherited. For example, the message name select[lisp] in area 1910 indicates that uncachedslotsmenu will respond to a message named "select." The "( ∧ )" symbol in area 1915 indicated that this method is inherited. Finally, the "impulse/dynamicmenu/select" entry in area 1920 indicates the name of the specific method that will be invoked in respond to the receipt of a select message by uncachedslotsmenu 1700. The item list for uncachedslotsmenu 1700 is generated by the method impulse/uncachedslotsmenu/items, referenced in the ITEMS slot 1925.

METHODS

Methods are Lisp functions that implement certain named behavior of objects. A few illustrative examples of methods utilized by the preferred embodiment of the present invention will be presented to better teach the present invention.

FIG. 20 illustrates a method impulse/uncachedslotsmenu/items which implements the items message received by uncachedslotsmenu object 1700 and generates a list of items that appear in Uncached Slots menu 1600. Note that since this method is expressly defined in uncachedslotsmenu object 1700, this method would have priority over any other methods or item lists defined by ancestors.

FIG. 21 illustrates a impulse/dynamicmenu/select method 2100 inherited by uncachedslotsmenu 1700 from dynamicmenu 205 which implements the Select message 1930 referred to in FIG. 19. The class object definition of dynamicmenu 205 is illustrated in FIG. 22. As illustrated, dynamicmenu 205 has a slot 2200 named Select with the name of impulse/dynamicmenu/select method 2100. This method makes the menu appear and implements methods enabling selections and the return of a result by sending messages to other objects or to itself.

FIG. 23 illustrates an impulse/commandmenu/selectionfn method referred to in the selectionfn slot 1930 of FIG. 19. This method is inherited from choicemenu, 215 as illustrated in the class object definition of choicemenu 215 in FIG. 24. Thus, uncachedslotsmenu 1700 will respond to a selectionfn message by executing the impulse/commandmenu/selectionfn method inherited from choicemenu 215. This method executes commands, stores choices, and may cause other menus to pop up or otherwise appear to make further selections as needed.

FIG. 25 illustrates an impulse/menu/code method referred to in code slot 1935 of FIG. 19 which implements the code message. FIG. 26 illustrates an impulse/choicemenu/execute method referred to in code slot 1940 of FIG. 19 which implements the execute message. FIG. 27 illustrates an impulse/choicemenu/interpretsection method referred to in code slot 1945 of FIG. 19 which implements the interpret-selection message.

RELATED APPLICATION

A related invention which permits the recursive chaining of menus constructed in accordance with the present invention is described in the patent application filed simultaneously with this application, titled An Object-Oriented Framework for Chained Menus, by Eric Jonathan Schoen and Reid Garfield Smith (U.S. patent application Ser. No. 07/195,287, filed May 17, 1988, abandoned in favor of copending continuing application Ser. No. 07/550,803, filed Jul. 10, 1990). That application is incorporated by reference.

While the invention has been particularly taught and described with reference to the preferred embodiment, those versed in the art will appreciate that minor modifications in form and details may be made without departing from the spirit and scope of the invention. For instance, while the preferred embodiment shows five (5) dimensions, alternative embodiments could use different numbers of dimensions and could use different definitions for the dimensions themselves without departing from the spirit of the invention. The preferred embodiment has two (2) alternatives for each dimension. However alternative embodiments could have more than two (2) choices one or more dimensions without departing from the spirit of the invention. Further, while the present invention has been described as a framework for developing menu interfaces for an application, it could also be used for the development of menu interfaces for operating systems or video games. Accordingly, all such modifications are embodied within the scope of this patent as properly come within my contribution to the art and are particularly pointed out by the following claims.

We claim:

1. Apparatus, comprising:
   a. a processor having an associated data store;
   b. a plurality of sets of class objects stored in said data store, each class object defining a menu behavior in a behavior dimension and the class objects of each said set collectively defining alternative menu behaviors in a respective one of a plurality of behavior dimensions;
   c. an individual object stored in said data store, said individual object defining a plurality of menu behaviors of a specific menu in multiple behavior dimensions by reference to class objects from which said menu behaviors are inherited, said plurality of menu behaviors comprising a menu behavior from each of a plurality of said sets of class objects; and display means for producing a visible menu display exhibiting said plurality of menu behaviors defined in said individeual object.

2. The apparatus of claim 1, wherein each said set of class objects defines mutually-exclusive alternative menu behaviors in one of said plurality of behavior dimensions.

3. The apparatus of claim 1, wherein said behavior dimensions are mutually orthogonal.

4. The apparatus of claim 1, wherein the alternative menu behaviors defined in each said set of class objects are independent of the alternative menu behaviors defined in other said sets of class objects.

5. The apparatus of claim 1, wherein said visible menu display comprises a list of menu items from which a user selection can be made, the apparatus further comprising input means for receiving user selections, and means responsive to user selections received by said input means for controlling behavior of said visible menu display in accordance with the menu behaviors defined in said individual object.

6. The apparatus of claim 5, wherein a first class object defines a dynamic menu behavior such that said visible menu display is terminated when a user selection is received by said input means, and a second class object defines a static menu behavior such that said visible menu display is continued when a user selection is received by said input means, said first class object and said second class object comprising one said set of class objects.

7. The apparatus of claim 5, wherein a first class object defines a command menu behavior such that said a command is issued to said processor when a user selection is received by said input means, and a second class object defines a choice menu behavior such that a value is provided to said processor when a user selection is received by said input means, said first class object and said second class object comprising one said set of class objects.

8. The apparatus of claim 5, wherein a first class object defines a single-choice menu behavior such that a value is provided to said processor when a single user selection is received by said input means, and a second class object defines a multiple-choice menu behavior such that a value is provided to said processor only after a plurality of user selections are received by said input means, said first class object and said second class object comprising one said set of class objects.

9. The apparatus of claim 5, wherein said menu display means further comprises means for producing a visible window display and a visible cursor display, wherein a first class object defines a multi menu behavior such that said visible menu display is positioned immediately adjacent said window display, and wherein a second class object defines a menutools menu behavior such that said visible menu display is positioned at said visible cursor display, said first class object and said second class object comprising one said set of class objects.

10. The apparatus of claim 5, wherein a first class object defines a sticky menu behavior such that a visual record of selection of a menu item of said list is indicated by said visible menu display when a user selection is received by said input means, and a second class object defines a nonsticky menu behavior such that no visual record of selection of a menu item of said list is indicated by said visible menu display when a user selection is received by said input means, said first class object and said second class object comprising one said set of class objects.

11. The apparatus of claim 5, wherein said menu display means further comprises means for producing a visible window display and a visible cursor display, and wherein:
   i. a first class object defines a dynamic menu behavior such that said visible menu display is terminated when a user selection is received by said input means, and a second class object defines a static menu behavior such that said visible menu display is continued when a user selection is received by said input means, said first class object and said second class object comprising a first said set of class objects;
   ii. a third class object defines a command menu behavior such that said a command is issued to said processor when a user selection is received by said input means, and a fourth class object defines a choice menu behavior such that a value is provided to said processor when a user selection is received by said input means, said third class object and said fourth class object comprising a second set of class objects;
   iii. a fifth class object defines a single-choice menu behavior such that a value is provided to said processor when a single user selection is received by said input means, and a sixth class object defines a multiple-choice menu behavior such that a value is provided to said processor only after a plurality of user selections are received by said input means, said fifth class object and said sixth class object comprising a third said set of class objects;
   iv. a seventh class object defines a multi menu behavior such that said visible menu display is positioned immediately adjacent said window display, and an eighth class object defines a menutools menu behavior such that said visible menu display is positioned at said visible cursor display, said seventh class object and said eighth class object comprising a fourth said set of class objects; and
   v. a ninth class object defines a sticky menu behavior such that a visual record of selection of a menu item of said list is indicated by said visible menu display when a user selection is received by said input means, and a tenth class object defines a nonsticky menu behavior such that no visual record of selection of a menu item of said list is indicated by said visible menu display when a user selection is received by said input means, said ninth class object and said tenth class object comprising a fifth said set of class objects.

12. An object-oriented framework for menu definition in a computer system having a processor, a data store, a display screen and a command input device, comprising:
   a. a taxonomy of ancestor class objects (e.g., FIG. 3) stored in said data store, each said class object comprising a definition of at least one potential menu behavior in at least one behavior dimension,
   b. a descendant menu object (e.g., FIG. 6) stored in said data store, said descendant menu object comprising: reference (e.g., 605) to at least one said ancestor class object from which potential menu behaviors in a plurality of behavior dimensions are to be inherited, and a list of menu variables (e.g., 615-635);
   c. means for constructing a menu instance object (e.g., FIG. 7) from said descendant menu object, said menu instance object comprising a reference (e.g., 705) to said descendant menu object; and
   d. means responsive to the content of said menu instance object for displaying on said display screen a menu (e.g., FIG. 4) which includes said list of menu variables and which exhibits a plurality of inherited menu behaviors, said inherited menu behaviors corresponding to the potential memory behaviors defined in said at least one ancestor class object referenced in said descendant menu object.

13. The framework of claim 12, wherein said menu instance object further comprises a window definition (e.g., 715), and wherein said displaying means comprises means for displaying said menu image at a location on said display screen determined by said window definition.

14. The framework of claim 12, further comprising:
   e. means for modifying said menu instance object (e.g., 710) in response to a command from said command input device; and
   f. means responsive to the content of said modified menu instance object for displaying on said display screen a menu image (e.g., FIG. 4) which includes said list of menu variables and which exhibits menu behaviors defined in said at least one ancestor class object referenced in said descendant menu object.

15. The framework of claim 12, wherein said menu variables comprise menu items, and wherein one said menu behavior comprises highlighting a menu item on said display screen in response to a command from said command input device representing a user selection of one said menu item.

16. The framework of claim 12, wherein said menu variables comprise menu items, and wherein one said menu behavior comprises terminating display of said menu image in response to a command from said command input device representing a user selection of one said menu item.

17. The framework of claim 12, wherein said descendant menu object comprises a reference to a first said ancestor class object from which a potential first behavior dimension is to be inherited, and a reference to a second said ancestor class object from which a potential behavior in a second behavior dimension is to be inherited.

18. The framework of claim 12, wherein said taxonomy of ancestor class objects comprises:
   i. a first set of ancestor class objects (e.g., 205-210) defining alternative potential menu behaviors in a first behavior dimension;
   ii. a second set of ancestor class objects (e.g., 215-220) defining alternative potential menu behaviors in a second behavior dimension;
   iii. a third set of ancestor class objects (e.g., 305, 310, 500, 505), each ancestor class object of said third set defining a potential menu behavior in said first behavior dimension by reference to an ancestor object of said first set and each ancestor class object of said third set defining a potential menu behavior in said second behavior dimension by reference to an ancestor object of said second set.

19. A method for constructing menus in a computer system having a processor, a data store associated with said processor, a display and an input device, comprising:
   a. storing in said data store a plurality of sets of ancestor class objects (e.g., 205-210, 215-220), each ancestor class object defining a potential menu behavior in a behavior dimension and the ancestor objects of each said set collectively defining alternative potential menu behaviors in a respective one of a plurality of behavior dimensions;
   b. storing in said data store a descendant class object (e.g., 500), said descendant class object comprising (i.) a reference (e.g., 605) to at least one said ancestor class object from which potential menu behaviors in a plurality of behavior dimensions are to be inherited and (ii.) a list of menu variables (e.g., 615-635);
   c. constructing a menu instance object (e.g., FIG. 7) from said descendant menu object, said menu instance object comprising a reference (e.g., 705) to said descendant menu object; and
   d. displaying a menu image (e.g., FIG. 4) on said display screen in dependence upon the content of said menu instance object, such that said menu image includes said list of menu variables and exhibits a plurality of inherited menu behaviors, said inherited menu behaviors corresponding to the potential menu behaviors defined in said at least one ancestor class object referenced in said descendant class object.

20. The method of claim 19, wherein said menu instance object further comprises a window definition (e.g., 715), and wherein said method further comprises the step of displaying said menu image at a location on said display screen determined by said window definition.

21. The method of claim 19, further comprising the steps of:
   e. modifying said menu instance object (e.g., 710) in response to a command from said input device; and
   f. displaying a menu image (e.g., FIG. 4) on said display screen in dependence upon the content of said modified menu instance object, such that said menu image includes said list of menu variables and exhibits a plurality of inherited menu behaviors, said inherited menu behaviors corresponding to the potential menu behaviors defined in said at least one ancestor class object references in said descendant class object.

22. The method of claim 19, wherein said menu variables comprise menu items, wherein one said menu behavior comprises highlighting a menu item on said display screen in response to a command from said command input device representing a user selection of one said menu item, and wherein said method further comprises the step of highlighting a menu item on said display screen in response to a command from said command input device representing a user selection of one said menu item.

23. The method of claim 19, wherein said menu variables comprise menu items, wherein one said menu behavior comprises terminating display of said menu image in response to a command from said command input device representing a user selection of one said menu item, and wherein said method further comprises the step of terminating display of said menu image in response to a command from said command input device representing a user selection of one said menu item.

24. The method of claim 19, wherein said step of displaying a menu image comprises the steps of:
   i. obtaining the reference to said descendant menu object from said menu image;
   ii. obtaining the reference to said at least one ancestor class object from said descendant class object;
   iii. obtaining the definition of potential menu behaviors from said at least one ancestor class object; and
   iv. generating said menu image on said display screen in dependence upon said definition of potential menu behaviors obtained from said at least one ancestor class object.

* * * * *